United States Patent
Mukhopadhyaya et al.

(10) Patent No.: US 10,567,519 B1
(45) Date of Patent: *Feb. 18, 2020

(54) SERVICE OVERLAY MODEL FOR A CO-LOCATION FACILITY

(71) Applicant: Equinix, Inc., Redwood City, CA (US)

(72) Inventors: Utpal Mukhopadhyaya, San Jose, CA (US); Kaladhar Voruganti, San Jose, CA (US); Sindhu Payankulath, Saratoga, CA (US); Syed Nawaz, Santa Clara, CA (US); Amit Srivastava, San Ramon, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,554

(22) Filed: Dec. 17, 2018

Related U.S. Application Data

(63) Continuation of application No. 15/099,428, filed on Apr. 14, 2016, now Pat. No. 10,158,727.
(Continued)

(51) Int. Cl.
*H04L 29/08* (2006.01)
*G06F 9/455* (2018.01)
(Continued)

(52) U.S. Cl.
CPC .......... *H04L 67/16* (2013.01); *G06F 9/45533* (2013.01); *G06F 17/00* (2013.01);
(Continued)

(58) Field of Classification Search
CPC ..... H04L 67/16; H04L 41/5051; H04L 67/10; H04L 67/18; H04W 4/023
See application file for complete search history.

(56) References Cited

U.S. PATENT DOCUMENTS 7,684,321 B2 * 3/2010 Muirhead ........... H04L 12/4641
370/230
8,423,672 B2 * 4/2013 Liu .................... H04L 29/12066
709/245
(Continued)

FOREIGN PATENT DOCUMENTS

WO     2018020446 A1    2/2018

OTHER PUBLICATIONS

Dredge, "The Missing Link: Service Function Chaining and Its Relationship to NFV," metaswitch.com, Nov. 25, 2015, 17 pp.
(Continued)

*Primary Examiner* — Arvin Eskandarnia
(74) *Attorney, Agent, or Firm* — Shumaker & Sieffert, P.A.

(57) ABSTRACT

In some examples, a method includes identifying, by a service overlay model engine executing at a computing device of a co-location facility provider, a plurality of service providers offering a service, the plurality of service providers co-located at one or more co-location facilities of the co-location facility provider; obtaining, by the service overlay model engine, first data obtained from the plurality of service providers describing the service; generating, by the service overlay model engine, second data describing the service based on one or more attributes of the service as delivered by the plurality of service providers and determined for the one or more co-location facilities by the co-location facility provider; and outputting, by the service overlay model engine and for display to a display device, based on a request for the service by a co-location facility customer, information based on the first data and the second data.

20 Claims, 7 Drawing Sheets

Related U.S. Application Data

(60) Provisional application No. 62/309,077, filed on Mar. 16, 2016.

(51) Int. Cl.
*G06F 17/00* (2019.01)
*H04L 12/24* (2006.01)
*H04W 4/02* (2018.01)

(52) U.S. Cl.
CPC .......... *H04L 41/5051* (2013.01); *H04L 67/10* (2013.01); *H04L 67/18* (2013.01); *H04W 4/023* (2013.01)

(56) References Cited

U.S. PATENT DOCUMENTS

| | | | |
|---|---|---|---|
| 8,495,199 B2 * | 7/2013 | Miller | H04L 41/5051 370/254 |
| 9,258,237 B1 | 2/2016 | Smith et al. | |
| 9,338,218 B1 | 5/2016 | Florissi et al. | |
| 9,485,323 B1 | 11/2016 | Stickle et al. | |
| 9,712,435 B2 | 7/2017 | Teng et al. | |
| 9,838,246 B1 | 12/2017 | Hegde et al. | |
| 9,948,552 B2 | 4/2018 | Teng et al. | |
| 9,983,860 B1 | 5/2018 | Koty et al. | |
| 10,015,268 B2 | 7/2018 | Rao | |
| 10,158,727 B1 | 12/2018 | Mukhopadhyaya et al. | |
| 2002/0004390 A1 | 1/2002 | Cutaia et al. | |
| 2003/0105810 A1 | 6/2003 | McCrory et al. | |
| 2011/0289329 A1 | 11/2011 | Bose et al. | |
| 2012/0303736 A1 | 11/2012 | Novotny et al. | |
| 2013/0041728 A1 | 2/2013 | Morrow et al. | |
| 2015/0067171 A1 | 3/2015 | Yum et al. | |
| 2015/0156065 A1 | 6/2015 | Grandhe et al. | |
| 2016/0127254 A1 | 5/2016 | Kumar et al. | |
| 2016/0127454 A1 | 5/2016 | Maheshwari et al. | |
| 2016/0301598 A1 | 10/2016 | Strijkers et al. | |
| 2016/0308762 A1 | 10/2016 | Teng et al. | |
| 2016/0330288 A1 | 11/2016 | Hoffman et al. | |
| 2016/0337473 A1 | 11/2016 | Rao | |
| 2016/0344798 A1 | 11/2016 | Kapila | |
| 2017/0201585 A1 | 7/2017 | Doraiswamy et al. | |
| 2017/0339070 A1 | 11/2017 | Chang et al. | |
| 2018/0060106 A1 | 3/2018 | Madtha et al. | |
| 2018/0367632 A1 | 12/2018 | Oh et al. | |
| 2019/0014102 A1 | 1/2019 | Mathew et al. | |

OTHER PUBLICATIONS

Filsfils et al., "Segment Routing Architecture," Network Working Group, draft-filsfills-rtgwg-segment-routing-00, Jun. 28, 2013, 28 pp.

Filsfils et al., "Segment Routing Architecture," Network Working Group, draft-filsfils-spring-segment-routing-04, Jul. 3, 2014, 18 pp.

Filsfils et al., "Segment Routing Use Cases," Network Working Group, draft-filsfills-rtgwg-segment-routing-use-cases-01, Jul. 14, 2013, 46 pp.

Filsfils et al., "Segment Routing with MPLS Data Plane," Network Working Group, draft-filsfils-spring-segment-routing-mpls-03, Jul. 31, 2014, 14 pp.

Previdi et al., "Source Packet Routing in Networking (SPRING) Problem Statement and Requirements," RFC 7855, Internet Engineering Task Force (IETF), May 2016, 19 pp.

U.S. Appl. No. 15/475,957, filed Mar. 31, 2017, by Wagner et al.

U.S. Appl. No. 15/720,956, by Utpal Mukhopadhyaya, filed Sep. 29, 2017.

Prosecution History from U.S. Appl. No. 15/099,428, dated Mar. 27, 2018 through Nov. 15, 2018, 33 pp.

Notice of Allowance issued in U.S. Appl. No. 15/720,956 dated Oct. 2, 2019, 8 pp.

\* cited by examiner

SERVICE OVERLAY MODEL FOR A CO-LOCATION FACILITY

This application is a continuation of U.S. application Ser. No. 15/099,428, filed Apr. 14, 2016, which claims the benefit of U.S. Provisional Patent Application 62/309,077, filed Mar. 16, 2016, the entire content of each of which are incorporated herein by reference.

TECHNICAL FIELD

The disclosure relates to computer networks and, more specifically, a co-location facility for interconnecting customers of the co-location facility provider.

BACKGROUND

A co-location facility provider (a "provider") may employ a communication facility, such as a data center or warehouse, in which multiple customers of the provider locate network, server, and storage gear and interconnect to a variety of telecommunications, cloud, and other network service provider(s) with a minimum of cost and complexity. By using co-location facilities of the provider, customers of the provider including telecommunications providers, Internet Service Providers (ISPs), application service providers, service providers, content providers, and other providers, as well as enterprises, enjoy high flexibility less interconnection latency and therefore can focus on their core business.

Cloud computing refers to the use of dynamically scalable computing resources, storage resources etc., accessible via a network, such as the Internet. Computing resources, often referred to as a "cloud," provide one or more services to users. These services may be categorized according to service types, which may include for examples, applications/ software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "services" refers not only to services provided by a cloud, but also to a form of service provisioning in which customers contract with service providers for the online delivery of services provided by the cloud. Service providers manage a public, private, or hybrid cloud to facilitate the online delivery of services to one or more customers. In some instances, multiple customers and service providers may have physical and/or logical network interconnections at co-location facility points that provide for high-speed transmission of information between the customers and service providers. The co-location facility may in such instances be alternatively referred to as an "interconnection facility."

SUMMARY

In general, techniques of the disclosure are directed to a co-location facility provider generating a service overlay model for services, such as cloud-based services, and using the service overlay model to provide information or recommendations to potential customers seeking one or more services from one or more cloud service providers. As the operator of co-location facilities in which multiple cloud service providers co-locate to offer cloud services, the co-location facility provider may leverage its unique vantage point in order to gather data that describes the cloud services' availability and delivery across facilities and across service providers as experienced by existing customers. The co-location facility provider provides this additional information as an "overlay" beyond the basic information available from the cloud service providers indicating what services are offered at what cost by the different cloud service providers at different facilities. In this way, the co-location facility provider leverages its central position within the multi-service provider co-location facilities to gather data and present information to help potential customers to more intelligently select a provider for a cloud service from among multiple cloud service providers and potentially from among multiple data centers, metros, and regions.

The co-location facility provider uses a service overlay model engine to collect performance data for various metrics associated with the cloud services offered by the cloud service providers, and generate the service overlay model based on the performance data. For instance, the service overlay model engine may characterize the cloud services based on one or more attributes such spatial characterization of services, temporal characterization of services, an aggregate view characterization of services, characterization based on service provisioning time, characterization based on service resolution time, characterization based on service support resolution capabilities, and other characterizations of services.

In one example aspect, a method includes identifying, by a service overlay model engine executing at a computing device of a co-location facility provider, a plurality of service providers offering a service, the plurality of service providers co-located at one or more co-location facilities of the co-location facility provider; obtaining, by the service overlay model engine, first data obtained from the plurality of service providers describing the service; generating, by the service overlay model engine, second data describing the service based on one or more attributes of the service as delivered by the plurality of service providers and determined for the one or more co-location facilities by the co-location facility provider; and outputting, by the service overlay model engine and for display to a display device, based on a request for the service by a co-location facility customer, information based on the first data and the second data.

In another example aspect, a computing device includes at least one computer processor, and a memory comprising instructions that when executed by the at least one computer processor cause the at least one computer processor to: identify a plurality of service providers offering a service, the plurality of service providers co-located at one or more co-location facilities of the co-location facility provider, obtain first data obtained from the plurality of service providers describing the service, generate second data describing the service based on one or more attributes of the service as delivered by the plurality of service providers and determined for the one or more co-location facilities by the co-location facility provider, and output for display to a display device, based on a request for the service by a co-location facility customer, information based on the first data and the second data.

In a further example aspect, a non-transitory computer-readable storage medium is encoded with instructions that, when executed, cause at least one processor of a computing device of a co-location facility provider to identify a plurality of service providers offering a service, the plurality of service providers co-located at one or more co-location facilities of the co-location facility provider, obtain first data obtained from the plurality of service providers describing the service, generate second data describing the service based on one or more attributes of the service as delivered by the plurality of service providers and determined for the one or more co-location facilities by the co-location facility provider, and output for display to a display device, based on a request for the service by a co-location facility customer, information based on the first data and the second data.

The details of one or more examples are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Figure 1:
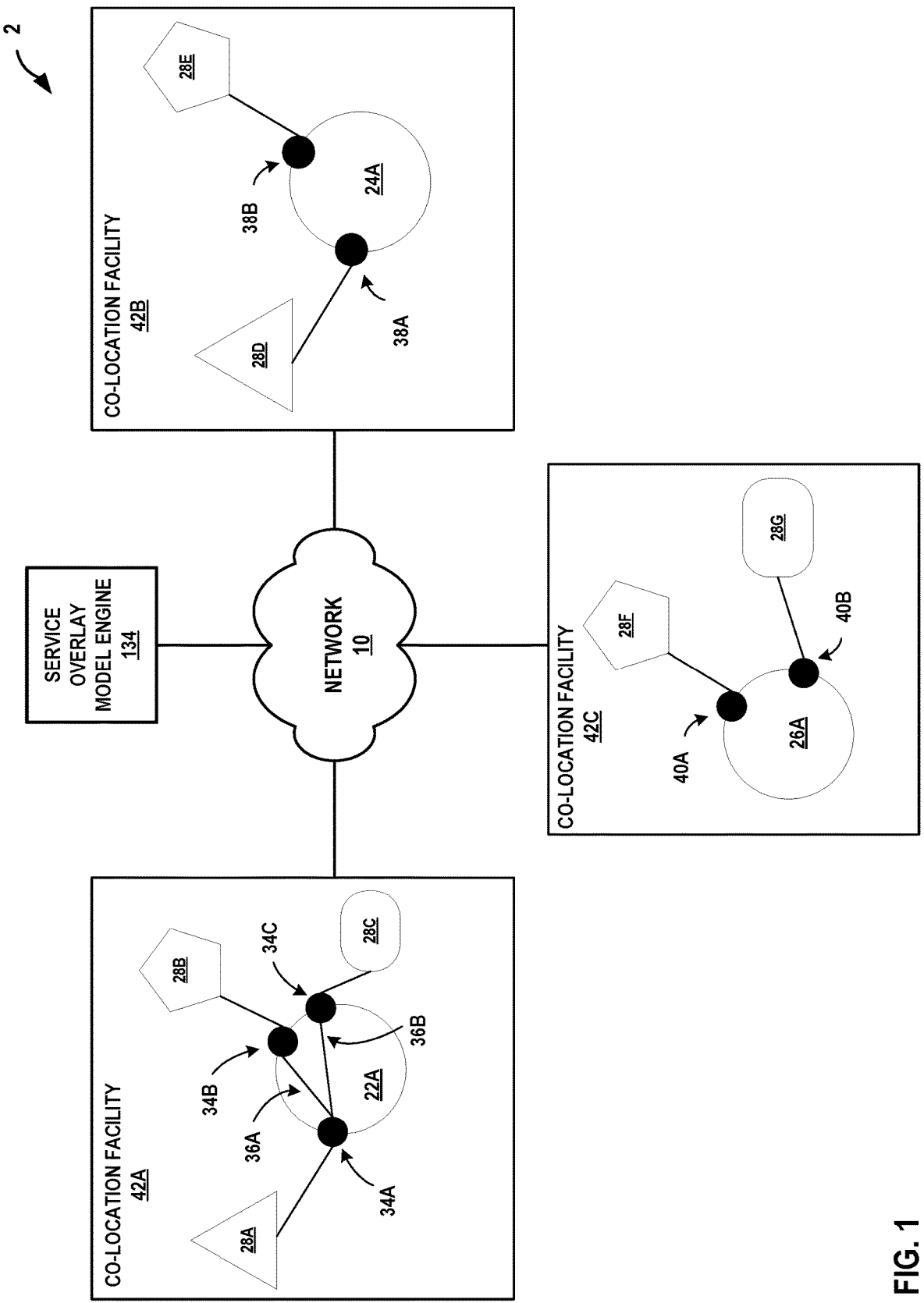
FIG. 1 is a block diagram illustrating a system 2 for co-location and interconnection between one or more co-location facility users, in accordance with one or more techniques of the disclosure.

A co-location facility provider ("provider") employs network infrastructure within a co-location facility that enables customers to connect, using interconnections established within the network infrastructure by the provider, to one another to receive and transmit data for varied purposes. For instance, a co-location facility may provide data transport services to one or more cloud-based services. The co-location facility in this way offers customers connectivity to a vibrant ecosystem of additional customers including content providers, Internet service providers, carriers, and enterprises. Customers of the co-location facility may connect for such end-uses as service delivery, content delivery, financial services, and Internet access, to give just a few examples.

A co-location facility may offer products such as cage, cabinet, and power to its customers. A co-location facility may also offer products relating to interconnection such as cross-connect and virtual circuit. As used herein, the term "customer" of the co-location facility provider or "co-location facility user" may refer to a tenant of at least one co-location facility deployed by the co-location facility provider, whereby the customer leases space within the co-location facility in order to co-locate with other tenants for improved efficiencies over independent facilities as well as to interconnect network equipment with the other tenants'/customers' network equipment within the co-location facility or campus for reduced latency/jitter and improved reliability, performance, and security versus transport networks, among other reasons. A co-location facility typically hosts numerous customers and their network, server, and/or storage gear. Each customer may have particular reasons for choosing a co-location facility, including capacity, geographical proximity, connecting to other customers, co-locating with other customers, and price.

A co-location facility may provide one or more different types of interconnections between customer networks for customers co-located in the co-location facility. For instance, a co-location facility may provide physical or "layer-1" (in the Open Systems Interconnection model (OSI Model)) interconnections between co-location facility users. Physical interconnections may include physical cross-connects that are established by category 5 or 6 (cat 5/6) cables, coaxial cables, and/or fiber optic cables, for instance. In some examples, a co-location facility may provide data link or "layer-2" (in the OSI Model) interconnections between co-location facility users. In some examples, a co-location facility that provides layer-2 interconnections may be referred to as an Ethernet Exchange, where Ethernet is the underlying layer-2 protocol. In some examples, a co-location facility may provide network and/or transport or "layer-3/4" (in the OSI Model) interconnections between co-location facility users. In some examples, a co-location facility that providers layer-3/4 interconnections may be referred to an Internet Exchange, where TCP/IP are the underlying layer-3/4 protocols. For example, a co-location facility that provides an Internet Exchange may allow customer routers to directly peer with one another using a layer-3 routing protocol, such as Border Gateway Protocol, to exchange routes for facilitating layer-3 traffic exchange to provide private peering. In some examples, a co-location facility may provide indirect layer-3 routing protocol peering whereby each customer announces its layer-3 routes to an autonomous system (AS) deployed by the co-location facility provider within the co-location facility network infrastructure to provide private peering mediated by the AS. The AS may then relay these routes in conjunction with tunneling or other forwarding mechanisms to establish an interconnection between customers. In some examples, a co-location facility that provides indirect layer-3 routing protocol peering to facilitate service traffic exchange is referred to as a Cloud-based Services Exchange or, more simply, a Cloud Exchange. Additional description of a cloud exchange is found in U.S. Provisional Appl. No. 62/149,374, filed Apr. 17, 2015, entitled "CLOUD-BASED SERVICES EXCHANGE," and U.S. Ser. No. 15/001,766, filed Jan. 20, 2016, entitled "MULTI-CLOUD, MULTI-SERVICE DATA MODEL," the entire content of each of which being incorporated by reference herein.

In some examples, a "connection" may be a physical or logical coupling between a co-location facility user in a customer or provider network and a co-location facility point. An "interconnection" may be a physical or logical coupling between connections that couple at least two co-location facility users. As such, a network infrastructure configuration within a co-location facility that enables customer networks to connect to exchange data may be referred to herein as an "interconnection." A cross-connect interconnection may refer to a physical coupling between two co-location facility customer networks. An Ethernet interconnection may be a layer 2 coupling between two co-location facility customer networks via ports of the co-location facility. An Internet or cloud exchange interconnection may be a layer-3/4 coupling between two co-location facility customer networks via ports of the co-location facility. The foregoing examples of co-location facilities and interconnections are exemplary only and many other types of co-location facilities and interconnections are possible.

FIG. 1 is a block diagram illustrating a system 2 for co-location and interconnection between one or more co-location facility users, in accordance with one or more techniques of the disclosure. FIG. 1 illustrates multiple geographically distributed co-location facilities 42A, 42B, and 42C. Each of co-location facilities 42A-42C may be separated by a distance of 50 miles or more in some examples. As shown in FIG. 1, co-location facility 42A includes a co-location facility network 22A. Similarly, co-location facility 42B includes a co-location facility network 24A, and co-location facility 42C includes a co-location facility network 26A. In some examples, co-location facilities 42A-42C represent a metro-based interconnection exchange made up of multiple co-location facilities within a single metropolitan area.

In the example of FIG. 1, co-location facility network 22A includes connections 34A-34C by co-location facility users 28A-28C. For instance, co-location facility user 28A may represent a system or network of the user that is coupled to co-location facility network 22A by connection 34A. Similarly, co-location facility user 28B may be a system or network of the user that is coupled to co-location facility network 22A by connection 34B. Co-location facility user 28C may be a system or network of the user that is coupled to co-location facility network 22A by connection 34C. FIG. 1 further illustrates two interconnections 36A and 36B. Interconnection 36A may be a physical or logical coupling between connections 34A and 34B that couple co-location facility user 28A to co-location facility user 28B. Interconnection 36B may be a physical or logical coupling between connections 34A and 34C that couple co-location facility user 28A to co-location facility user 28C. As described above, a cross-connect interconnection may refer to a physical coupling (e.g., fiber or Cat5/6 cable between two network devices and/or systems of co-location facility users). An Ethernet interconnection may be a layer-2 coupling between two co-location facility users, such as one or more Virtual Local Area Networks (VLANs) or other logical networks providing L2 reachability. An Internet exchange interconnection may be a layer-3/4 coupling between two co-location facility users, such as a layer-3 network path provided by an Internet Exchange. In some examples, an interconnection may be a virtual circuit established at least in part within a co-location facility. The interconnections described herein may include at least one of a physical cross-connect, a virtual Ethernet connection providing a layer 2 forwarding path, a direct layer 3 peering arrangement to establish an end-to-end layer 3 forwarding path (e.g., using a layer 3 VPN), and an indirect layer 3 peering arrangement to establish an end-to-end layer 3 forwarding path (e.g., using a layer 3 VPN). Customers may establish multiple interconnections over a single physical port. For example, a customer may exchange data via a L2 interconnection with a first cloud service provider and via a L3 interconnection with a second cloud service provider, both the L2 and L3 interconnections operating over a single customer port for the customer. In some examples, an enterprise customer may have multiple interconnections, operating over a single port, with multiple different cloud service providers to receive cloud-based services.

In some examples, co-location facilities may simply provide network infrastructure to host multiple Cloud Service Providers (CSPs) and are primarily focused on ensuring network connectivity between the customers (Enterprises, Network Service Providers/Aggregators) and the CSPs. These co-location facilities may operate with a simple service level agreement (SLA) having requirements for network uptime, data throughput, data latency, delay, jitter etc. and try to ensure best possible user-level experience perceived by the customers when subscribed to the CSPs offering a variety of cloud-based services like SaaS, PaaS, IaaS etc. The SLAs offered may vary depending on the parties involved, such as (1) SLAs between the end customers and the co-location facilities (2) SLA's between the co-location facility and the CSPs or (3) even SLA's between the end customers and the CSPs. There may or may not be complex dependency among different types of SLAs, but to enforce and track these SLAs, co-location facilities may measure and monitor various metrics in their network infrastructure on a periodic basis.

In accordance with the techniques of this disclosure, instead of offering plain and simple passive network connectivity between enterprises and cloud service providers, the provider of co-location facilities 42 can build an intelligent knowledge base by gaining better visibility and understanding of the various applications or services offered by the various providers. This may involve the co-location facilities provider taking steps to understand and/or ensure more granular metrics needed for those applications to succeed. In some cases, the co-location facilities provider may tune or optimize co-location facility network(s) to improve the application experience for the end user. To give an example, if some CSPs are offering storage services as one of their offerings, co-location facilities providers would pro-actively build a knowledge base on what it takes to make end users have good storage services experience by ensuring their networks meet quality metrics requirement demanded of storage service offering like read Latency, write latency, scale demands of large number of concurrent users from an enterprise accessing those storage services offered by CSPs, etc.

This process is referred to herein as service/application characterization, where services/applications are defined as a function of tangible quantifiable attributes and metrics. End users subscribed to those service offerings from various providers (CSPs) will have good application experience if those metrics are satisfied by the network ecosystem provided by the co-location facilities. For instance, as described in further detail below the service characterizations may be based on one or more attributes such as spatial characterization of services, temporal characterization of services, an aggregate view characterization of services, characterization based on service provisioning time, characterization based on service support resolution capabilities, and other characterizations of services.

FIG. 1 depicts service overlay model engine 134 as connected to network 10, whereby service overlay model engine 134 may access data describing performance of services provided by service providers of co-location facilities 42. This data may include data describing co-location facility users 28, interconnections 36, connections 34, or co-location facility networks 22, 24, or 26. Service overlay model engine 134 may generate a service overlay model data store based on telemetry data, service provider data, and service data, for instance. In some examples, service data may include information about the actual measured performance of services or applications in co-location facilities 42. Service overlay model engine 134 may also query historical service performance data describing past performance of services within co-location facilities 42 and generate the service overlay model based in part on the the historical data. Service overlay model engine 134 is configured based on the metrics selected by the co-location facilities provider for characterizing each service, and then service overlay model engine 134 collects and analyzes data for each of the metrics to populate a service model for each service.

Assume, for example, that one or more of co-location facility users 28 represent different cloud service providers (CSPs). Two or more CSPs may offer the same sets of services, such as network storage services. By virtue of the service characterization model described herein, co-location facilities provider will be able to compare among the network storage services provided by the different CSPs. If every metric for storage services turns out to be the same for all CSPs, the co-location facilities provider can then compare the service offerings based on cost or pricing structures published by CSPs and include this information in the service overlay model.

The techniques of this disclosure may be used by co-location facilities providers, and may be particularly useful to multi-cloud co-location facilities providers, i.e., co-location facilities having multiple different CSPs as tenants that co-locate in the co-location facilities, and their customers. As the operator of co-location facilities in which multiple cloud service providers co-locate to offer cloud services, the co-location facility provider may leverage its unique vantage point in order to gather data that describes the cloud services' availability and delivery across facilities and across service providers as experienced by existing customers. This disclosure describes a mechanism by which co-location facilities providers can provide value to their end customers by offering a service overlay model that can help guide the customers in selecting a CSP from which to receive one or more services. Co-location facilities providers can build this service overlay by adding or specifying additional key attributes to the CSP-offered services which will be of value to end customers. The co-location facilities providers, through their service overlay model, can help customers decide which services or sets of services from which co-location facilities will satisfy their service requirements, at what cost. In accordance with the techniques of this disclosure, the co-location facilities providers dynamically specify or characterize the services, and define new attributes to help make those characterizations and build the knowledge base used by the service overlay model for providing customers with information and making recommendations.

Accordingly, service overlay model engine 134 may recommend that a customer or potential customer (e.g., co-location facility user 28A) connect to one or more service providers in co-location facility 42A for receiving particular services. As such, service overlay model engine 134 may output display data indicating the recommendation to co-location facility user 28A. Upon generating, based on the service overlay model, the information describing the characteristics of the service providers and the services offered, for each co-location facility, service overlay model engine 134 may output display data indicating the information and/or recommendation to co-location facility user 28A.

Service overlay model engine 134 may output, for display to the co-location facility provider or to another user, one or more recommendations (including, for example, raw service characterization data) generated by the service overlay model engine 134 by application of the service overlay model. In some examples, service overlay model engine 134 may rank the service providers and co-location facilities based on a score, such as in descending order of highest score to lowest score. The rankings or score may be displayed. In this way, co-location facility user 28A is provided with information to help determine which service providers at which co-location facilities would provide the services in a manner best suited to the customer's needs.

Figure 2:
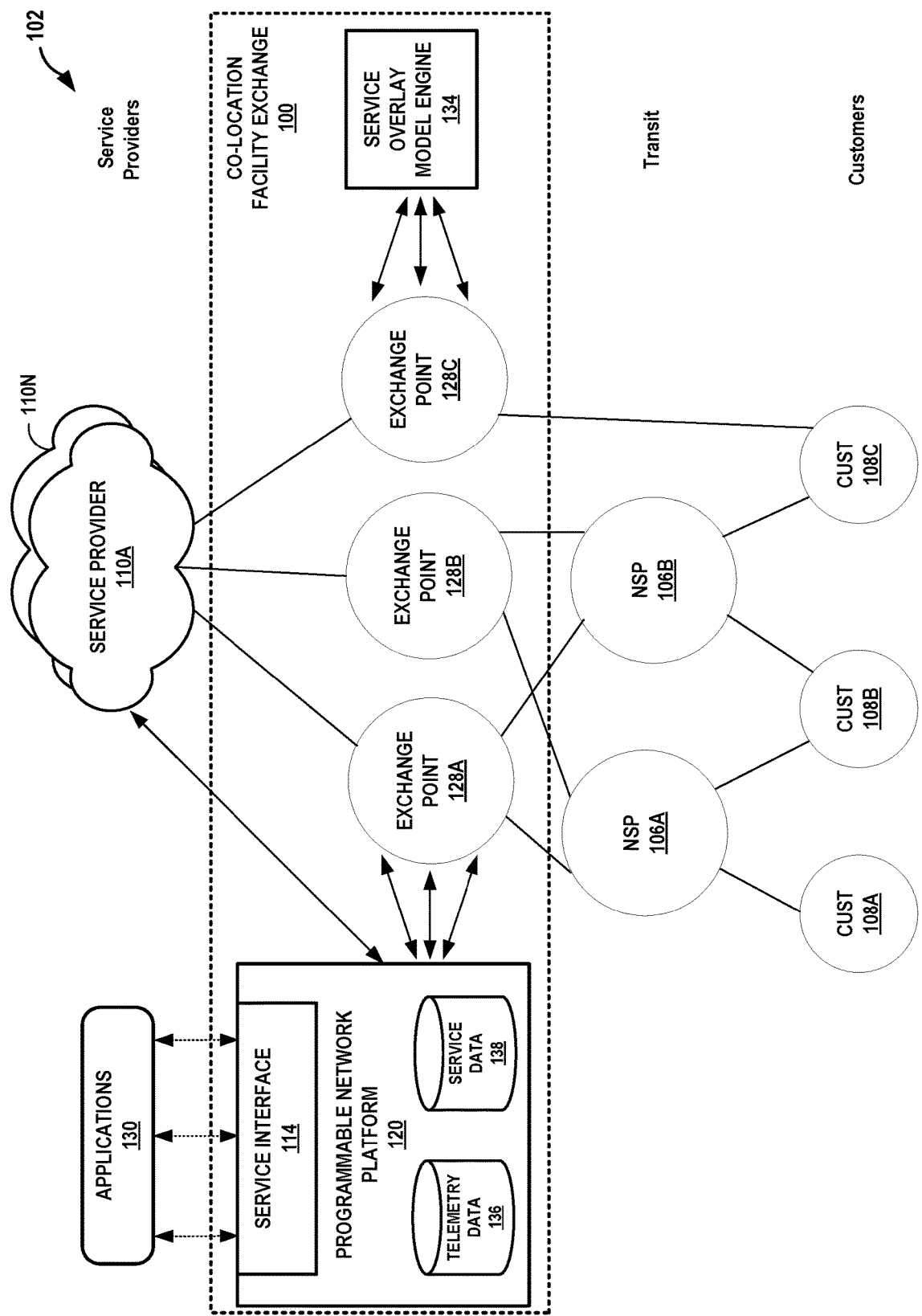
FIG. 2 is a block diagram that illustrates techniques for generating a service overlay model based on service characterization data obtained from co-location facility exchange 100, in accordance with techniques of the disclosure.

FIG. 2 is a block diagram that illustrates techniques for generating a service overlay model based on service characterization data obtained from co-location facility exchange 100, in accordance with techniques of the disclosure. FIG. 2 depicts one embodiment of co-location facility exchange 100 and the interconnections between service providers 110A-110N ("SPs 110" or "service providers 110") and customers 108. For instance, a metro-based co-location facility exchange 100 may enable customers 108A-108C ("customers 108") to bypass the public Internet to directly connect to services providers 110 so as to improve performance, reduce costs, increase the security and privacy of the connections, and leverage cloud computing for additional applications.

The multiple SPs 110 participate in the co-location facility by virtue of their having at least one accessible port in the co-location facility by which a customer can connect to the one or more services offered by the SPs 110, respectively. According to various examples described herein, metro-based co-location facility exchange 100 may allow private networks of any customer to be directly cross-connected to any other customer at a common point, thereby allowing direct exchange of network traffic between the networks of the customers.

Customers may include network carriers 106A-106B (collectively, "NSPs 106," or alternatively, "carriers 106"), enterprises, and other users of services offered by one or more service providers. Examples of services offered by service providers 110 include one or more of compute services, content delivery network services, firewall services, network address translation (NAT) services, applications/software services, platforms services, infrastructure services, virtualization services, server services and data storage services. In some examples, SPs 110 may be cloud service providers. SPs 110 may offer such services as Software-as-a-Service (SaaS), Platform-aaS (PaaS), Infrastructure-aaS (IaaS), Virtualization-aaS (VaaS), and data Storage-aaS (dSaaS).

FIG. 2 illustrates a conceptual view of a network system 102 providing metro-based interconnection in which multiple co-location facility points located in a metropolitan area enable interconnection according to techniques described herein. Each of co-location facility exchange points 128A-128C (described hereinafter as "co-location facility points" and collectively referred to as "co-location facility points 128") of metro-based co-location facility exchange 100 (alternatively referred to as "metro 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent co-location facilities by which customers and service providers connect to receive and provide, respectively, services. In other words, metro 100 may include multiple co-location facilities geographically located with a metropolitan area.

In some examples, each of the multiple co-location facilities geographically located with a metropolitan area may have low-latency links that connect the multiple co-location facilities in a topology to provide metro-based interconnection services between customers receiving interconnection services at different co-location facilities in the metro-based interconnect facility hub. In various examples, metro-based co-location facility exchange 100 may include more or fewer co-location facility points 128 than shown in FIG. 2. In some instances, metro-based interconnection exchanges 100 may include just one co-location facility exchange point 128. A co-location facility provider may deploy instances of co-location facilities 100 in multiple different geographically distributed metropolitan areas, each instance of metro-based co-location facility exchange 100 having one or more co-location facility exchange points 128.

Each of co-location facility exchange points 128 includes network infrastructure and an operating environment by which customers 108 receive services from one or more of multiple SPs 110. As noted above, an interconnection may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective routers of interconnected customers directly peer and exchange layer 3 routes for service traffic exchanged via the metro-based co-location facilities exchange 100, and a cloud exchange in which customer routers peer with metro-based co-location facilities exchange 100 (or "provider") routers rather than directly with other customers. Each of exchange points 128 may provide interconnection to cloud services and, in such instances, co-location facility exchange 100 may represent a metro-based cloud exchange.

For interconnections at layer-3 or above, customers 108 may receive services directly via a layer 3 peering and physical connection to one of co-location facility exchange points 128 or indirectly via one of NSPs 106. NSPs 106 provide "transit" by maintaining a physical presence within one or more of co-location facility exchange points 128 and aggregating layer 3 access from one or customers 108. NSPs 106 may peer, at layer 3, directly with one or more co-location facility exchange points 128 and in so doing offer indirect layer 3 connectivity and peering to one or more customers 108 by which customers 108 may obtain services from the metro-based co-location facility hub 100.

In instances in which co-location facility exchange points 128 offer a cloud exchange, each of co-location facility exchange points 128, in the example of FIG. 2, is assigned a different autonomous system number (ASN). For example, co-location facility exchange point 128A is assigned ASN 1, co-location facility exchange point 128B is assigned ASN 2, and so forth. Each co-location facility exchange point 128 is thus a next hop in a path vector routing protocol (e.g., BGP) path from service providers 110 to customers 108. As a result, each co-location facility exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more service providers 110 to customers. In other words, co-location facility exchange points 128 may internalize the eBGP peering relationships that service providers 110 and customers 108 would maintain on a pair-wise basis. Instead, a customer 108 may configure a single eBGP peering relationship with a co-location facility exchange point 128 and receive, via the co-location facility, multiple services from one or more service providers 110. While described herein primarily with respect to eBGP or other layer 3 routing protocol peering between co-location facility points and customer, NSP, or service provider networks, the co-location facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with the co-location facility provider for metro-based co-location facility hub 100 to directly access layer 3 services via co-location facility exchange point 128C and also to have contracted with NSP 106B to access layer 3 services via a transit network of the NSP 106B. Customer 108B is illustrated as having contracted with multiple NSPs 106A, 106B to have redundant access to co-location facility exchange points 128A, 128B via respective transit networks of the NSPs 106A, 106B. The contracts described above are instantiated in network infrastructure of the co-location facility exchange points 128 by L3 peering configurations within switching devices of NSPs 106 and co-location facility exchange points 128 and L3 connections, e.g., layer 3 virtual circuits, established within co-location facility exchange points 128 to interconnect service provider 110 networks to NSPs 106 networks and customer 108 networks, all having at least one port offering connectivity within one or more of the co-location facility exchange points 128.

As shown in FIG. 2, programmable network platform 120 may include telemetry data 136 and service data 138. Telemetry data 136 may include metrics about the quantity, type, and definition of network and resource configurations that are configured by programmable network platform 120. Telemetry data 136 may include analytics information from infrastructure data collectors based on raw metrics data for resources used in a particular service. Service data 138 may include, for example, service temporal data, service spatial data, service aggregate data, service support data, and service provisioning time data.

In some examples, telemetry data 136 may include information that indicates connections of co-location facility users to co-location facility points. For instance, a co-location facility user may include a service customer or service provider. In some examples, a connection may be a physical or logical (e.g., L2 or L3) coupling between a co-location facility user in a user network (e.g., customer network or provider network) and a co-location facility point. Telemetry data 136 may include information that indicates interconnections between co-location facility users at a co-location facility point. In some examples, an interconnection may be a physical or logical coupling between at least two co-location facility users in a co-location facility point.

As shown in FIG. 2, service overlay model engine 134 may be included in metro-based co-location facility exchange 100. In other examples, service overlay model engine 134 may be implemented within programmable network platform 120. In some examples, service overlay model engine 134 may be implemented outside of metro-based co-location facility exchange 100, such as in a different geographic location than metro-based co-location facility exchange 100. In any case, service overlay model engine 134 may be operably coupled to programmable network platform 120, such that service overlay model engine 134 may communicate with programmable network platform 120. As described in this disclosure, service overlay model engine 134 may be implemented in hardware, software, or a combination of hardware and software. For example, service overlay model engine 134 may be executed by one or more real servers or virtual machines in any of the co-location facilities described herein or a branch office of the facilities provider, or by another suitable computation environment. Aspects service overlay model engine 134 may be executed in a distributed manner. For example, generation of the service overlay model may be performed by one or more servers and querying the service overlay model for display to a user may be performed by a user workstation.

Service providers 110 provide one or more services, such as compute services, content delivery network services, firewall services, network address translation (NAT) services, applications/software services, platforms services, infrastructure services, virtualization services, server services and data storage services, for example. In some examples, different services providers 110 provide different subsets of the above services, with some of the same services being provided by multiple different service providers 110.

In accordance with techniques of the disclosure, service overlay model engine 134 may generate a service overlay model based at least in part on telemetry data 136 and service data 138, and output to a potential customer 108 information characterizing the services and/or recommendations for a service provider from which to obtain a service, based on the service overlay model.

In operation, to generate the recommendations, service overlay model engine 134 may obtain service performance information from programmable network platform 120. The data describing service performance within the co-location facility exchange 100 includes data measured by the co-location facility provider and characteristics of the service provider independent of information provided by the service providers 110. Programmable network platform 120 may include service interface 114 that may exchange information with applications 130. Service overlay model engine 134 may obtain service performance information based at least in part on querying telemetry data 136 and service data 138. For instance, service overlay model engine 134 may determine a co-location facility user identifier that identifies a particular co-location facility user (e.g., a service provider 110). Service overlay model engine 134 may send a request or query to programmable network platform 120 for information relating to the service provider 110. In some examples, the set of interconnections may specify service identifiers of services provided by the service provider 110, geographic locations of co-location facilities in which service provider 110 offers services, and/or identifiers of co-location facilities that include the services, to name only a few examples.

Service overlay model engine 134 may use the data described herein to generate a recommendation for a particular service provider. For instance, service overlay model engine 134 may apply a service overlay model to the data described herein to generate a service performance score for the particular service provider. The application of a service overlay model may involve machine learning algorithms that can receive and analyze multiple input variables populated by multi-factor data describing service performance within the co-location facility exchange 100 as measured by the co-location facility provider, and characteristics of the service provider independent of information provided by the service providers 110. Machine learning algorithms may include, but are not necessarily limited to, algorithms such as neural networks, random forest, k-means, k-nearest neighbors, linear regression, decision tree, naïve Bayes classifier, support vector machines, and Gaussian processes.

Service overlay model engine 134 may apply machine learning algorithms to historical data to identify the relative importance of each input variable. Service overlay model engine 134 may use machine learning algorithms to fine-tune the service overlay model. Specifically, service overlay model engine 134 may apply machine learning algorithms to historical data to measure how accurately the service overlay model predicted previous indications of service performance. Service overlay model engine 134 may use machine learning algorithms to calibrate the service overlay model by adjusting the weights associated with each input variable.

In some examples, service overlay model engine 134 applies a least squares method for machine learning. Service overlay model engine 134 may apply the service overlay model to a set of historical data, and may measure each of the inaccuracies of the service overlay model's prediction. Using the least squares method, for example, service overlay model engine 134 may quantify and square the magnitude of each inaccuracy. Service overlay model engine 134 may then apply one or more additional service overlay models and may square the magnitude of each inaccuracy for each service overlay model. In this example, using the least squares method, service overlay model engine 134 may then select the service overlay model with the lowest sum of squares.

Service overlay model engine 134 may have one or more input variables to which service overlay model engine 134 applies a service overlay model. By identifying the relative importance of each input variable, service overlay model engine 134 may assign weights to each input variable. For example, if service overlay model engine 134 examines the historical data and identifies latency as a relatively important input variable and power usage as a relatively unimportant input variable, service overlay model engine 134 may assign a relatively high weight to latency and a relatively low weight to power usage. Service overlay model engine 134 may use a machine learning algorithm such as least squares to calibrate the weights of each input variable to minimize errors. There are many other machine learning algorithms that service overlay model engine 134 may use, in addition to or in the alternative to least squares, such as neural networks, random forest, Bayesian algorithms, k-means, support vector algorithms, and so forth.

In one example, service overlay model engine 134 may assign specific weights to each input variable. The specific weights that service overlay model engine 134 assigns may correspond to the importance or influence of each input variable. Through the use of machine learning algorithms in this embodiment, service overlay model engine 134 may adjust the specific weights for one or more input variables based on recent data. The receipt of data relating to users that recently chose to obtain services as recommended by service overlay model engine 134 or chose not to obtain services as recommended by service overlay model engine 134 may prompt service overlay model engine 134 to adjust the specific weights for one or more input variables. Example input variables include information from telemetry data 136 and service data 138. In some examples, service overlay model engine 134 may output, for display to the customers 108, scoring data, comparison data, or other recommendations/information regarding services available from multiple service providers.

Figure 3:
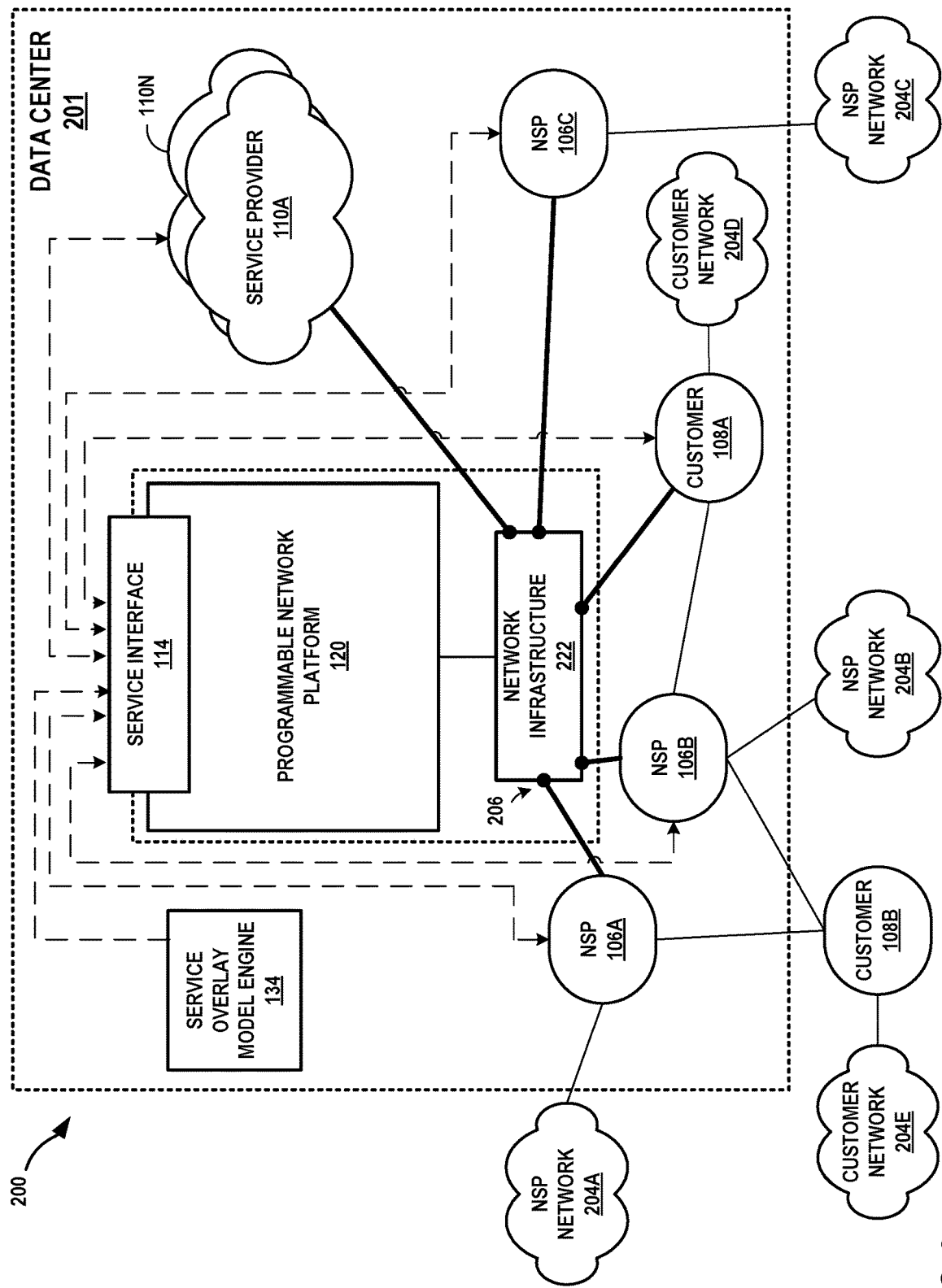
FIG. 3 is a block diagram illustrating a high-level view of a data center that provides an operating environment for a co-location facility, in accordance with techniques of the disclosure.

FIG. 3 is a block diagram illustrating a high-level view of a data center 201 that provides an operating environment for a co-location facility 200, and a service overlay model engine 134 that generates information and/or recommendations for display to customers or potential customers, in accordance with techniques of the disclosure. Co-location facility 200 allows a corresponding one of customer networks 204D, 204E and NSP networks 204A-204C (collectively, "'private' or 'carrier' networks 204") of any NSPs 106A-106C or other customers including customers 108A, 108B to be directly cross-connected, via a layer 2 (L2) or layer 3 (L3) connection to any other customer network and/or to any of service providers 110A-110N, thereby allowing exchange of service traffic among the customer networks and SPs 110. Data center 201 may be entirely located within a centralized area, such as a warehouse or localized data center complex, and provide power, cabling, security, and other services to NSPs, customers, and service providers that locate their respective networks within the data center 201 (e.g., for co-location) and/or connect to the data center 201 by one or more external links.

In some examples, SPs 110 may be cloud service providers. SPs 110 may offer such services as Software-as-a-Service (SaaS), Platform-aaS (PaaS), Infrastructure-aaS (IaaS), Virtualization-aaS (VaaS), and data Storage-aaS (dSaaS), via the co-location facility 200. Network service providers 106 may each represent a network service provider that is associated with a transit network by which network subscribers of the NSP 106 may access services offered by SPs 110 via the co-location facility 200. In general, customers of SPs 110 may include network carriers, large enterprises, managed service providers (MSPs), as well as other customers generally seeking any of the SaaS, PaaS, IaaS, VaaS, and dSaaS services offered by the SPs 110.

As shown in FIG. 3, data center 201 may include service overlay model engine 134 operated by the co-location facility provider of data center 201. Service overlay model engine 134 has a good view of all the services being offered by data center 201, and potentially of other data centers. Service overlay model engine 134 may be operably coupled to programmable network platform 120, such that service overlay model engine 134 may communicate with programmable network platform 120. In accordance with techniques of the disclosure, service overlay model engine 134 may determine service-related scoring data for service providers 110, and output such scoring data to a potential co-location facility customer.

In some examples, service overlay model engine 134 generates service characterization information and/or recommendations for display to customers or potential customers, in accordance with techniques of the disclosure. Service overlay model engine 134 may receive a request for information from a co-location facility customer or potential co-location facility customer. In some examples, the customer may be a customer 108A located in data center 201 and may be interconnected with other customers in data center 201. In other examples, the customer may be customer 108B located external to data center 201 and connecting to data center 201 via one or more NSPs 106.

Service overlay model engine 134 that generates information and/or recommendations for display to customers or potential customers, in accordance with techniques of the disclosure. Service overlay model engine 134 may query telemetry data associated with interconnections established between customer 108A and service providers 110 at data center 201. Service overlay model engine 134 may query service data associated with service providers 110. Service overlay model engine 134 may query telemetry data and service data for co-location facilities other than co-location facility 200 and data center 201. Service overlay model engine 134 may apply a service overlay model to the telemetry data and service data to generate information and/or recommendations for customer 108A.

In some examples, service overlay model engine 134 may generate a service overlay model using one or more of: (i) data describing a temporal view of services in one or more co-location facilities (including for example, data center 201), (ii) data describing a spatial view of services in one or more co-location facilities, (iii) data describing an aggregate view of services in one or more co-location facilities, (iv) data describing a support view of services in one or more co-location facilities, and (v) data describing a service provisioning view in one or more co-location facilities. The service overlay model may be based upon data relating to one or more of the above types of data.

In these and other examples, service overlay model engine 134 may use one or more machine learning algorithms as part of generating the service overlay model. Machine learning algorithms applied by service overlay model engine 134 may take many forms and may include various variable importance measuring methods like regression analysis, Gini importance, permutation importance, and other measurements for determining statistical significance. Regression analysis may provide an equation, algorithm, and/or coefficients for a multi-variable analysis that, when applied to data described herein, produces a recommendation. Service overlay model engine 134 may periodically perform regression analysis or another tool using then-existing data to update the equation or algorithm for future use. Based on the service overlay model, service overlay model engine 134 generates service characterization information and/or recommendations.

In some examples, service overlay model engine 134 collects data regarding services applied by one or more service providers via co-location facilities such as data center 201, and analyzes the data to obtain a temporal view of services provided in data center 201. The term "temporal view of services" refers to information indicating how services offered by various service providers (e.g., CSPs) in a particular data center are doing over time, such as how services fared in the past in the particular data center 201 and how the services are likely to perform in the future in data center 201 based on the information gathered over time. Since data centers constantly monitor their underlying service infrastructure all over the world, service overlay model engine 134 can leverage the data collected by this monitoring to obtain a temporal view.

For example, administrators of data center 201 may measure and monitor traffic passing through its network infrastructure. The co-location facility provider may already send, measure and monitor test traffic from network infrastructure 222 to track adherence to SLAs. For example, the co-location facility provider associated with data center 201 may send test traffic from network infrastructure 222 within data center 201 to each of service providers 110 for application of network services to the test traffic, and can measure application performance by analyzing the test traffic. Service overlay model engine 134 can invoke service interface 114 as an interface to network infrastructure 222, to trigger additional test traffic as needed to measure performance of services provided by service providers 110 over time. Service overlay model engine 134 may be configured to invoke service interface 114 to network infrastructure 222 to send the test traffic on a periodic basis (e.g., hourly, daily, weekly), and/or upon one or more conditions being met, such as whenever a new service or service provider 110 becomes available. Over time, the co-location facility provider of data center 201 builds a temporal view of how applications or services offered by service providers 110 are doing in data center 201.

In some examples, the temporal view may show a volume of traffic that passes through data center 201 over time period such as a week, a month, and a year. In some examples, the co-location facility provider can use the logs of the historical snap shots can to build a predictive model for future performance. The co-location facility provider can use the temporal view and accompanying predictive model to characterize a service in data center 201 and help guide the customers in selecting from among the multiple service providers 110.

For example, if a customer 108B is interested in receiving services provided by service provider 110A, and needs those services at a specified time in the future but has flexibility as to which of a plurality of data centers to connect to for receiving the services, service overlay model engine 134 may apply a service overlay model based on the temporal view to recommend to the customer 108B one data center as being predicted to have a lighter traffic load for the specified time as compared to a second data center that is predicted to have a higher traffic load for the specific time. In this manner, the service overlay model can model how certain amounts of traffic or congestion are likely to occur in certain locations, e.g., based on seasonal fluctuations or around recurring major events (e.g., major broadcast sporting events). The service overlay model engine 134 provides this additional information as an "overlay" to the basic information regarding simply what services are offered by the different service providers.

In some examples, service overlay model engine 134 collects data regarding services applied by one or more service providers via co-location facilities such as data center 201, and analyzes the data to obtain a spatial view of services provided in data center 201. The term "spatial view of services" refers to information indicating the geographical regions from which the customer can select services or sets of services. This view of services can be important, as multiple data centers in multiple regions or metros may offer similar services. Multi-cloud data centers usually operate in geographically diverse regions facilitating connectivity to customers all around. Spatial diversity of service offering models is another aspect data centers should consider.

For example, as in FIG. 1, the same sets of CSPs may be present in multiple geographical regions. In some cases, services provided by service provider 110A are offered inexpensively in one metro in a region compared to the same services offered by service provider 110A another metro in the same region. This may happen due to a lower cost to service provider 110A to run those services in that metro or even a current promotion by service provider 110A to attract customers in a particular metro, for example. In some cases, hosting data centers can have different pricing structures for various metros, with these different costs being passed on by service providers 110 to customers. Service overlay model engine 134 can collect and analyze data relating to the spatial view of services, and generate a service overlay model based at least in part on the spatial view of services. When data center 201 receives a request from a customer or potential customer for information on available services, in some examples service overlay model engine 134 generates information characterizing the services in terms of spatial characteristics, such as cost of services provided in different geographical regions. This information can help guide the customers in selecting a data center in which to set up a cage for connecting to a service provider 110, or selecting a data center to which to connect to a service provider 110 via an NSP 106.

In some examples, service overlay model engine 134 collects data regarding services applied by one or more service providers via co-location facilities such as data center 201, and analyzes the data to obtain an aggregate view of services provided in data center 201. The term "aggregate view of services" refers to information indicating a brokerage capability of a data center, such as data center 201. That is, the data center can receive a set of service requirements from a customer (e.g., an enterprise), and guide the enterprise to which CSP, or set of CSPs (in case of a service chain) in which data center(s) will provide the best choice for the received service requirements. For example, the service overlay model engine 134 may identify a service chain for application of each of a plurality of services by a different service provider in the service chain, such as by identifying a lowest cost service provider for providing each of the plurality of services.

The facility provider for data center 201 has the information of which various CSPs are tenants in the data center 201 and various services offered by those CSPs, the cost structure offered by the CSPs, and the facility provider collects data regarding service performance in data center 201. Given a set of service requirements by customers, the service overlay model engine 134 of data center 201 can, in some examples, offer the role of a "cloud broker." Based on the aggregate view of services the service overlay model engine 134 of the data center 201 can help the enterprises decide which cloud vendor(s) will be the best choice for the enterprise's application needs, and which data center offers the cost-effective, efficient, and optimal choice. In some cases, service overlay model engine 134 may provide a recommendation to the enterprise based on the aggregate view of services.

For example, a potential enterprise customer provides information specifying a list of services the enterprise is looking for, such as compute services, content delivery network services, firewall services, network address translation (NAT) services, applications/software services, platform services, infrastructure services, virtualization services, server services and data storage services. Service overlay model engine 134 has information about which of service providers 110 in data center 201 provides the best firewall services in terms of cost, throughput performance, and latency. Service overlay model engine 134 likewise has information about the compute and storage services provided by each of the service providers 110. Service overlay model engine 134 can guide the enterprise customer to particular service providers 110 for providing each of the needed services in a way that suits the enterprise's needs. For example, service overlay model engine 134 can offer to route the enterprise customer's traffic through a service chain consisting of storage services by service provider 110A, compute services by service provider 110B, firewall services by service provider 110C, and NAT services by service provider 110N, at a specified cost. Service overlay model engine 134 outputs this recommendation for display to the enterprise customer. In some examples, the different service providers providing services in the proposed service chain reside in different data centers in different metros or regions.

In some examples, service overlay model engine 134 collects data regarding services applied by one or more service providers via co-location facilities such as data center 201, and analyzes the data to obtain a support view of services provided in data center 201. Another important attribute of our service overlay model by which services can be characterized is the support assurances provided by data centers for those services. The term "support view of services" refers to data indicating how quickly a data center resolves customer issues. Support infrastructure such as multi-providers agreements or network operations center (NOC)-to-NOC agreements signed in a data center may influence resolution time significantly, and is an important attribute to consider.

For the same services, it may happen one data center has an edge over another in terms of support agreement between the data center and its CSP tenants or even between data center and customers, such as NSPs, to resolve a service-impacting issue with faster resolution time. Typical examples would include backhaul networks where services are offered from same CSP, but data centers may have to deal with multiple providers (such as Dark Fiber providers) in the middle before services reach end customers. This may result in complex multi-provider agreements and resolution of an issue seen by customers may take more time compared to another data where similar issues may not be present.

The support agreements may be used as parameters for service overlay model engine 134 to quantify the support provided by data centers. Some CSPs may have more primitive agreements; others may have more comprehensive, sophisticated agreements. These aspects can be quantified and included as part of the service overlay model, and thereby presented to potential customers. A potential customer may, in some examples, be able to specify an amount of downtime due to support issues that they can tolerate. Perhaps a first potential customer can deal with 15 minutes to 1 hour of downtime due to support issues, while a second potential customer needs fantastic support service, e.g., guaranteed less than 15 minutes to resolve any issue. Service overlay model engine 134 can provide information to the potential customers characterizing the service offerings of various CSPs based at least in part on the customer's service support needs and the support view of services aspect of the service overlay model. In some examples, service overlay model engine 134 provides a recommendation to the potential customer based on the support view of services.

In some examples, service overlay model engine 134 collects data regarding services applied by one or more service providers via co-location facilities such as data center 201, and analyzes the data to obtain a service provisioning view of services provided in data center 201. The term "service provisioning view of services" refers to an amount of time it takes for a data center to adopt a customer.

An important consideration for enterprises is the speed by which services required by them are provisioned in a data center. An enterprise may find information about likely service provisioning time to be helpful in selecting a data center from which to receive the services. Service overlay model engine 134 may collect and store information relating to infrastructure, logistics, administration, agility, available capacity, and capacity planning associated with data centers, as some of the factors that may influence service provisioning time. Service overlay model engine 134 may analyze the collected data to generate an estimated service provisioning time for different data centers. It may happen that one data center can ensure faster implementation than another, and service overlay model engine 134 can guide customers based on a service provisioning view of services aspect of the service overlay model. In some examples, service overlay model engine 134 collects historical data relating to actual service provisioning times, and includes this as a component of the service overlay model for predicting future service provisioning times.

Service overlay model engine 134 may present information to a potential customer indicating that in co-location facility 42A, it will take about one day to bring up the desired services, and in co-location facility 42C, it will take three to four days to bring up the desired services. These predicted service provisioning times may be for the same services provided by the same service provider in the different co-location facilities.

In this manner, data centers such as data center 201 can build the service overlay model over and above CSP-offered services by building application visibility, geographical diversity, cost modelling of the services, performance predictive modelling capability, cloud brokerage capability, support and provisioning infrastructure capability. The data center can leverage its unique position in having a neutral infrastructure and view of the entire data center ecosystem, and leverage some data already being collected, to provide intelligent service characterization and add value to customers by helping them select a service provider, or set of service providers, that best meet the customer's needs. The data center's multi-cloud provider model can allow the ability to offer a multi-cloud service chain solution for the customer's various service needs, using network functions virtualization (NFV) techniques.

Another advantage comes with respect to policy specification. In the example of FIG. 3, a customer 108A can specify a single policy at a customer interface to programmable network platform 120, and programmable network platform 120 can push the policy across all the NFVs across all the multiple service providers 110. This avoids the customer having to enter policies multiple different times, for each service providers 110. In this way, the customer can be offered a multi-cloud service chain solution to their service needs, and then simply enter a single policy and rely on programmable network platform 120 to do the work of translating the single policy to multiple policies for services provided by the different service providers 110.

Figure 4:
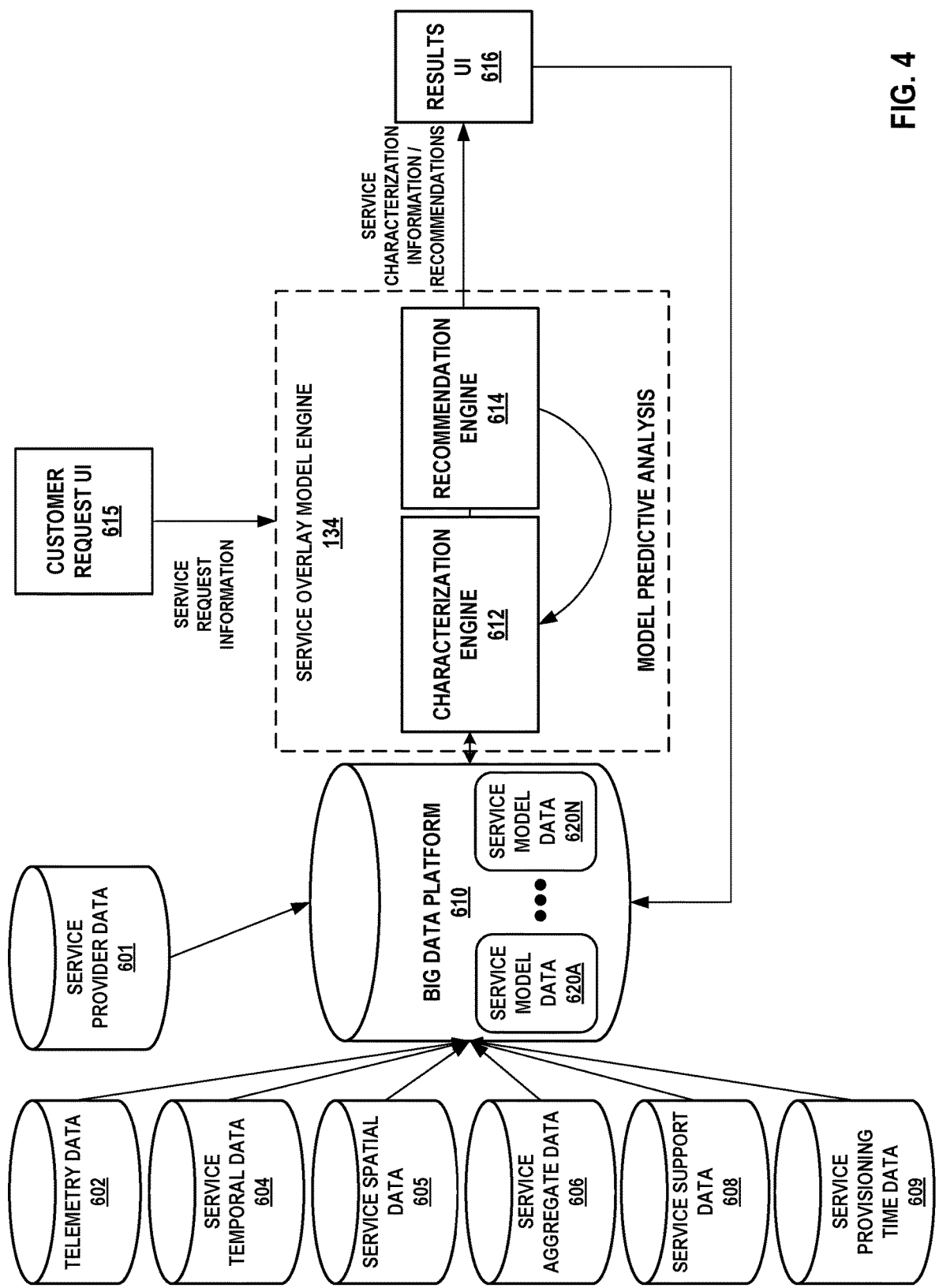
FIG. 4 is a conceptual diagram of components used to generate a service overlay model, in accordance with techniques of this disclosure.

FIG. 4 is a conceptual diagram of components used to generate and apply a service overlay model, in accordance with techniques of this disclosure. Each of components 602-616 and 134 may be implemented in hardware, software, or a combination of hardware and software. As shown in FIG. 4, service overlay model engine 134 may include a characterization engine 612, which analyzes various types of data to generate a service overlay model characterizing one or more services in accordance with techniques of this disclosure, and a recommendation engine 614, which applies the service overlay model to a customer request to provide service characterization information and/or recommendations for services provided by one or more service providers. In some cases, characterization performs predictive analytics to predict future characteristics, e.g., performance, of the one or more services. To generate the service overlay model, service overlay model engine 134 may query big data platform 610 for information, such as but not limited to service model data, service performance data, customer data, co-location facility user information, connection and interconnection information, co-location facility information, power and network usage data, to name only a few examples. Using this information, service overlay model engine 134 may generate the service overlay model characterizing the services and apply the service overlay model to service request information to generate service characterization information and/or recommendations for co-location facility customers or potential customers.

In the example of FIG. 4, big data platform 610 may provide analysis, capture, data curation, search, sharing, storage, transfer, visualization of data received from, but not limited to, service provider data 601, telemetry data 602, service temporal data 604, service spatial data 605, service aggregate data 606, service support data 608, service provisioning time data 609, and service model data 620A-620N. In some examples, each of service provider data 601, telemetry data 602, service temporal data 604, service spatial data 605, service aggregate data 606, service support data 608, service provisioning time data 609, and service model data 620A-620N may be implemented in a Relational Database Management System (RDBMS), Object Database Management System (ODBMS), Online Analytical Processing (OLAP) system, or Big Data Computing system, to name only a few examples. Big data platform 610 may receive data from one or more of service provider data 601, telemetry data 602, service temporal data 604, service spatial data 605, service aggregate data 606, service support data 608, service provisioning time data 609, and service model data 620A-620N on a periodic, user prompted, or real-time basis.

Service provider data 601, telemetry data 602, service temporal data 604, service spatial data 605, service aggregate data 606, service support data 608, service provisioning time data 609, and service model data 620A-620N may include data associated with several different co-location facilities, such as data centers in different metros and different regions, for example.

Service provider data 601 may include information about each of multiple service providers 110 that are users of a co-location facility, such as types of services offered by the service provider, prices offered by the service providers for the services (including promotional offerings), and other service provider data. Service providers 110 may be cloud service providers, for example. Examples of services offered by service providers 110 include one or more of compute services, content delivery network services, firewall services, network address translation (NAT) services, applications/software services, platforms services, infrastructure services, virtualization services, server services and data storage services.

Telemetry data 602 may include metrics about the quantity, type, and definition of network and resource configurations that are configured by programmable network platform 120. Telemetry data 602 may include analytics information from infrastructure data collectors based on raw metrics data for resources used in a particular service. In some examples, telemetry data 602 includes connection information that describes a connection that a co-location facility user has to a co-location facility network. In some examples, telemetry data 602 includes interconnection information that describes an interconnection between at least two customer networks at a co-location facility point or co-location facility. Telemetry data 602 may include metrics describing the transmission of data in or through a co-location facility by a particular co-location facility user. Telemetry data 602 may indicate a current configuration of a co-location facility network for interconnecting customers.

In some examples, big data platform 610 may also analyze co-location data (not shown) such as customer data, power usage data, and network usage data. Customer data may include information that identifies a co-location facility user, billing information for the co-location facility user, location information for the co-location facility user, co-location/interconnection preference information for the co-location facility user, to name only a few examples. Power usage data may include information that indicates the amount of electrical power consumed by servers and other equipment for a particular co-location facility customer (e.g., a service provider). Network usage data may include information that indicates the amount of data that a particular co-location facility customer has sent or received. Network usage data may include information describing the size and number of data transmissions corresponding to a particular co-location facility customer, to name only a few examples. Power usage data and network usage data may include information describing historical power usage and network usage for a particular co-location facility customer in order to provide reference for comparing the current or recent power usage and network usage.

Service overlay model 134 also may receive configuration data from an administrator of the co-location facility provider specifying what metrics or reference points to include in the service overlay model. The administrator can select the metrics based on what information seems important to customers having a good experience with a service. For example, CSPs have various attributes they want to expose for the various services, indicating service performance (e.g., latency, bandwidth, number of packet drops, cost). However, these attributes are measured by the CSPs based on ideal conditions (e.g., with the customer in the same place as CSP), yet this information are not necessarily reflective of the actual end customer experience.

Moreover, every application comes with its own unique minimum and maximum characteristics that a network needs to have to run the application. The co-location facility provider can obtain the reference points for different types of services by analyzing CSP offerings, including how the CSPs advertise the attributes of their services, and application thresholds and levels, and determine what metrics to include in configuration data used for configuring the service overlay model engine 134. The configuration data may include information for weighting different factors. Service overlay model 134 in turn builds a model out of the various service characterizations included in the configuration data.

The co-location facility provider can measure this for each flow, for each suite of services, in each data center, for each CSP. The co-location facility provider may also have different test suites for the various services, and may send test traffic from the co-location facility provider's equipment to the different service providers to obtain actual performance data for various metrics. For example, the co-location facility provider may test a file transfer service and record how long it takes for a file transfer to occur. For example, service overlay model engine 134 invokes service interface 114 to create a test point in a network of service provider 110A and initiated a file transfer from the test point network infrastructure 222 (FIG. 3). In this manner, the co-location facility provider emulates a customer to obtain data on how well the file transfer performs for this particular service provider 110A.

In some examples, the test traffic is sent periodically according to a defined schedule for the metric. In other examples, the test traffic is sent dynamically, such as in response to service overlay model engine 134 determining that a new service provider has joined a co-location facility, or that a service provider has added a service. In some examples, service overlay model 134 may also monitor various data centers' usage patterns for every CSP.

Service temporal data 604 includes information indicating how services offered by various service providers (e.g., CSPs) in a particular data center are doing over time, such as how services fared in the past in the particular data center 201 and how the services are likely to perform in the future in data center 201 based on the information gathered over time.

Service spatial data 605 includes data indicating the geographical regions from which the customer can select services or sets of services, including different data centers, metros, and regions. Service aggregate data 606 includes information about different service providers by which comparison can be drawn between the different service providers, and can be used by service overlay model engine 134 to provide a brokerage function and for service chain provisioning.

Service support data 608 stores data indicating a support view of services, such as data indicating how quickly a data center resolves customer issues. This may include data associated with SLAs and other agreements in place between the data center and its service provider tenants and between the data center and customers.

Service overlay model engine 134 collects data regarding services applied by one or more service providers via co-location facilities such as data center 201, and analyzes the data to obtain a service provisioning view of services provided in data center 201. Service overlay model engine 134 may analyze the collected data to generate an estimated service provisioning time for different data centers. Service overlay model engine 134 stores the data to service provisioning time data 609.

Service overlay model engine 134 may determine a service performance trend for a particular service provider 110 by using data indicating prior service performance for the service provider 110. Service overlay model engine 134 may compare the data indicating prior service performance for the service provider 110 with service temporal data 604 indicating current service performance. For example, if the file transfer times for a file transfer service have increased or decreased, service overlay model engine 134 may determine a service performance trend based on this information that service overlay model engine 134 can incorporate into its multi-variable analysis.

As shown in FIG. 4, service overlay model engine 134 includes characterization engine 612 and recommendation engine 614. In accordance with techniques of this disclosure, characterization engine 612 builds service model data 620A-620N ("service model data 620") for each of a plurality of different services. For example, characterization engine 612 selects a first service (referred to as "Service A") and selects a first service provider, e.g., service provider 110A. Characterization engine 612 may identify telemetry data 602 indicating interconnections established between the selected service provider 110A and other co-location facility customers. Characterization engine 612 may identify service temporal data 604 indicating how the selected service provided by the service provider 110A has performed over time. Characterization engine 612 may identify service spatial data 605 indicating how the selected service provided by service provider 110A perform in different data centers, metros, and/or regions. Characterization engine 612 may identify service aggregate data 606 indicating how the selected service provided by the service provider 110A performs and how the cost of the selected service offered by service provider 110A compare in different regions, such as based in part on data obtained from service provider data 601. Characterization engine 612 may identify service support data 608 indicating what levels of service support are available for the selected service provided by service provider 110A. Characterization engine 612 may identify service provisioning time data 609 indicating how long it takes for the selected service from service provider 110A to be provisioned.

If service overlay model engine 134 determines that certain service-related data is not available for the service provider, in some examples service overlay model engine 134 may trigger sending of probes or test traffic to test the service performance of service provider 110A and obtain additional data to be stored in the service-related data repositories 604-609. Characterization engine 612 stores this data to service model data 620A characterizing service A based on a selected set of parameters. Characterization engine 612 may do this for every service provider that offers the service A, and for every data center in which service A is available. In this manner, characterization engine 612 may generate a service overlay model based at least in part on the data 601-609. Characterization engine 612 may use machine learning algorithms to modify the manner in which it generates service characterization information and/or recommendations.

Service overlay model engine 134 can receive service request information from a customer or potential customer describing what services the customer is seeking, via customer request UI 615. In some examples, service overlay model engine 134 may, via customer request UI 615, present the customer with questions designed to gather specific service request information that service overlay model engine 134 needs to apply the service overlay model and generate service characterization data and/or recommendations, and the customer may enter the service request information in response to the questions. Questions service overlay model engine 134 present may include, for example: what geographic area do you want to be located in? What types of services do you need? What level of service support do you need? For what dates do you need the services? How soon do you need the services provisioned?

In some examples, customer request UI 615 and results UI 616 may be presented on the same user interface of a single display device. Customer request UI 615 and results UI 616 may include one or more user interface elements to receive or output information, such as but not limited to: labels, input fields, drop-down menus, buttons, images, tab controls, and navigation controls to name only a few examples. Customer request UI 615 and results UI 616 may be output by a web-based application executing on a server of the co-location facility provider, in some examples.

Recommendation engine 614 applies the service overlay model to service request information received from customer request UI 615, and outputs the service characterization information and/or recommendations for display to a customer or potential customer seeking services. Service overlay model engine 134 may query service provider data 601 to identify a plurality of service providers offering a service requested by a co-location facility customer. Service overlay model engine 134 generates information comparing metrics associated with the service available via the co-location facility provider from the plurality of service providers that offer the service, based on information provided by the co-location facility customer and the service overlay model characterizing performance of the service. For example, service overlay model engine 134 may query the particular service model data structure 620 that corresponds to the particular service, to obtain the information. In addition to guiding service overlay model engine 134 to a particular service model data structure 620, the information provided by the customer may be used to filter the information that service overlay model engine 134 obtains from the service model data structure 620 so that only information relevant to the customer is obtained when generating the information comparing the metrics associated with the service.

In some examples, the characterization engine 612 may score a service provider according to the scores for other service providers with similar characteristics, such as services offered, costs, business type, and facility location. The score may indicate a degree to which the offerings of the service provider match with the needs of the customer based on the service request information. A service provider profile for a service provider may also include pricing information for services, the service provider market segment(s), services offered or consumed, latency, bandwidth offered, file transfer speed, and other service provider or service performance data. Service provider data 601 may store such information as part of service provider profiles. Characterization engine 612 may compare the profiles of service providers with similar service offerings in order to generate a recommendation or ranking.

In some examples, characterization engine 612 may rank each service provider option based on the service characterization information and/or recommendations. This may be represented in the output displayed to a potential customer at results UI 616. In some examples, characterization engine 612 may score and/or rank different data centers according to how well suited their service offerings are to the customer's requirements (e.g., cost, performance, service provisioning time, etc), and output this information for display. In some examples, customer request UI 615 and results UI 616 may be presented on the same user interface of a single display device.

In some examples, characterization engine 612 may output for display the prices offered by the different CSPs in particular metro area(s). In some examples, results UI 616 may be generated by service overlay model engine 134 and output to a display (e.g., a computer monitor or a tablet, smartphone, or PDA interface). In some examples, recommendation engine 614 may send one or more messages to the potential customer, such as an email, text message, or other suitable communication.

In some examples, the potential customer may interact with results user interface 616 to view potential service providers and their service offerings in further detail. In some cases, the customer can make a selection of a service provider or suggested service chain based on the service characterization information/recommendations, and service overlay model engine 134 will invoke programmable network platform 120 to convey the selection and trigger instantiation of an interconnection between the customer and network infrastructure 222 for providing the selected service(s) to the customer. This may be possible, for example, when the customer is already an existing customer of the co-location facility provider.

Because many of the service providers are present in almost all the data centers all over the world, recommendation engine 614 can provide information that compares the service offerings in the different data centers. Different service providers may offer different prices in different data centers. For example, costs at different data centers may differ, e.g., due to differing real estate costs in the different markets, cost of network connectivity in different data centers, etc. The colocation facility provider may charge the service providers differently at the different data centers, and the service providers in turn will charge their customers differently based on the underlying cost. As another example, service providers may run discounted price promotions in different data centers to encourage customers to join in locations having lower demand. For example, the Silicon Valley data center is oversubscribed so demand is high, so the service provider has also set that data center price high, but the Washington, D.C. data center is cheaper because the service provider is running a promotion. Many enterprise customers also have globally distributed locations, so the spatial comparison information would be helpful to them, because the enterprise customers could connect in either Silicon Valley or Washington, D.C. so the enterprise customers can choose the cheaper one. But, the performance may be slightly different in each DC, so this performance info can be presented to them too by characterization engine 612 and the customer can make a decision on the cost/performance trade-off based on the information provided by characterization engine 612.

When an enterprise selects a data center and CSP based on the recommendation, the enterprise can move in and collocate there, or they can access the data center via their NSP network. In some cases, service overlay model engine 134 may determine that a multi-cloud service chain is the best option for a customer, and service overlay model engine 134 may suggest that the potential customer go for collocating in the data center that has the multi-cloud option. Or the customer could connect via NSP (without physically co-locating), which is connected to the data centers having all the CSPs for the service chain. The co-location facility provider provides an ecosystem. In contrast to a model in which all the NFVs are instantiated within a single CSP's cloud, here the multi-cloud service chain involves stitching service chains across multiple clouds. This disaggregation provides the customer more flexibility because they are not tied to a single CSP, but can switch out one or more services to be provided by different CSP if desired.

Figure 5:
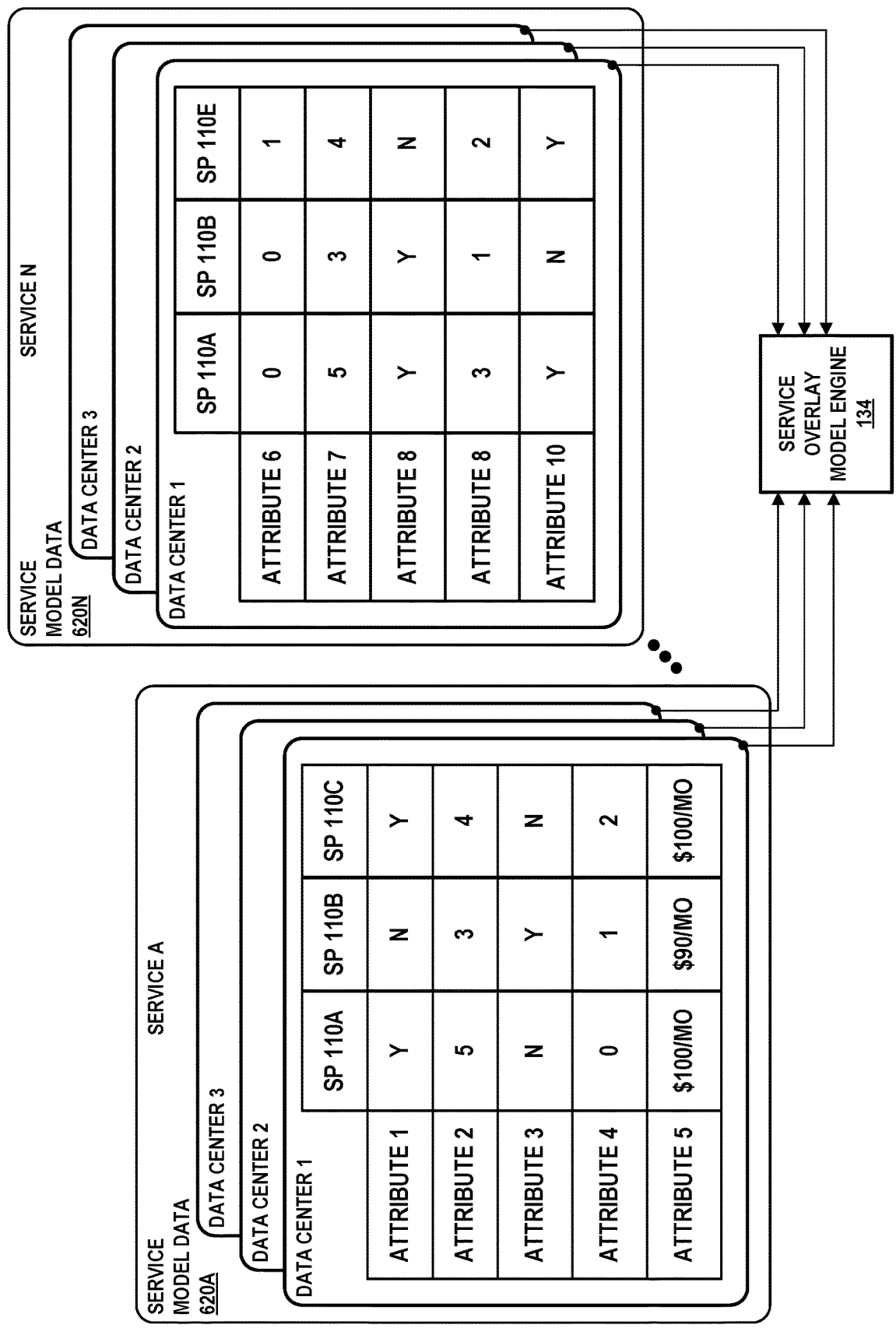
FIG. 5 is a block diagram illustrating example service model data of FIG. 4 in further detail, in accordance with one example aspect of the techniques of this disclosure.

FIG. 5 is a block diagram illustrating example service model data 620A-620N of FIG. 4 in further detail, in accordance with one example aspect of the techniques of this disclosure. In the example of FIG. 5, service model data 620A includes information associated with a first service ("service A"), for each of a plurality of data centers 1-3 in which service A is offered (e.g., co-location facilities 42A-42C of FIG. 1), and for each of a plurality of service providers 110 offering service A in the data centers 1-3. Service A may be characterized by multiple attributes, in this example attributes 1-5. Service model data 620A includes entries associated with each attribute for the different service providers 110. The entries may include data indicating a metric value for the attribute, such as a number, score, level, amount, or other metric value. For example, attributes for a storage service may include storage size (in GB), bandwidth, predicted latency, predicted file transfer time, monthly cost, service provisioning time, and whether service support is offered. Service model data 620A-620N may include first data obtained from the service providers (e.g., cost, amount of bandwidth) as well as second data generated by the service overlay model engine 134 describing the service based on attributes of the service as delivered by the service providers and measured within one or more co-location facilities by the co-location facility provider (e.g., latency, file transfer time). The second data forming a service overlay over the first data to present a more comprehensive view of service delivery beyond merely that data which is available from the service providers.

Service model data 620N includes information associated with a first service ("service N"), for each of a plurality of data centers 1-3 in which service N is offered (e.g., co-location facilities 42A-42C of FIG. 1), and for each of a plurality of service providers 110 offering service N in the data centers 1-3. In some examples, the set of service providers offering service N may differ than the set of service providers offering service A, and similarly with the set of data centers in which the service is available. Service N may be characterized by multiple attributes, in this example attributes 6-10, which may be a different set of attributes than those for service A, although different services may share some common attributes (e.g., cost). Services may be characterized in terms of more or fewer attributes than depicted in FIG. 5.

In some examples, characterization engine 612 of service overlay model engine 134 may obtain, generate, organize, or store service model data 620A-620N based on one or more of service provider data 601, telemetry data 602, service temporal data 604, service spatial data 605, service aggregate data 606, service support data 608, and service provisioning time data 609 (FIG. 4). Recommendation engine 614 of service overlay model engine 134 may also access service model data 620A-620N for generating service characterization and/or recommendations for display to a potential customer via results UI 616.

When service overlay model engine 134 receives a request from a potential customer for information on one or more services of interest, service overlay model engine 134 queries service model data 620 associated with the relevant service(s) to obtain data for providing information to the potential customer. In some cases, service overlay model engine 134 displays raw data from service model data 620 to the customer, while in other examples, service overlay model engine 134 may analyze the data to present a recommendation based on the data, such as a recommended service provider or set of service providers to provide the requested service(s). For example, in the case of the customer requesting multiple services, service overlay model engine 134 may present a recommendation for a service chain that provides individual services from different service providers 110 of data center 201 (or even from different data centers).

In one example, service overlay model engine 134 may generate an updated service overlay model periodically, such as once per month. In another example, service overlay model engine 134 may generate an updated service overlay model more or less frequently than once per month.

Figure 6:
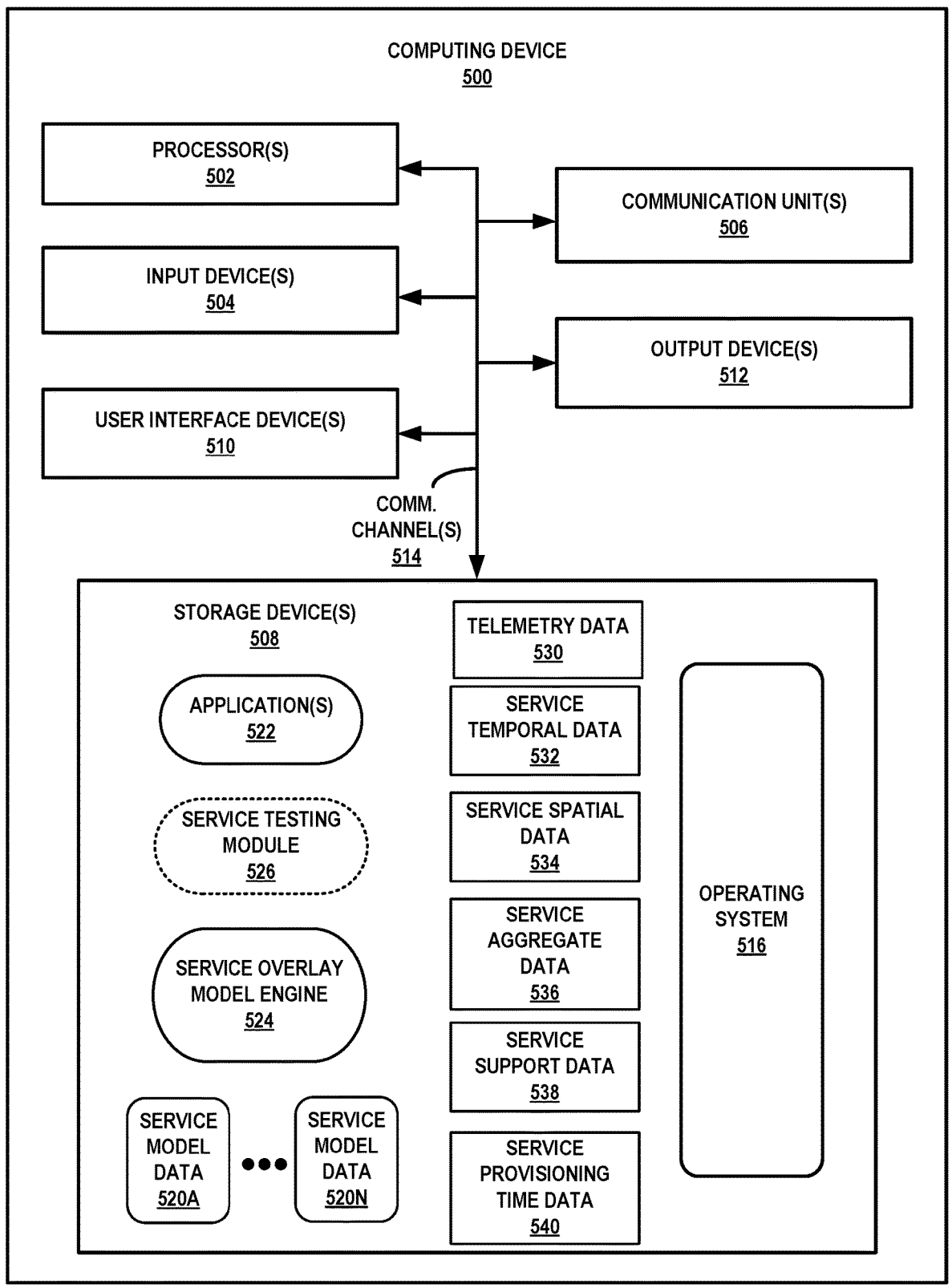
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 500 that includes one or more processor(s) 502 for executing any one or more of service overlay model engine 134, or any other computing device described herein. Other examples of computing device 500 may be used in other instances. Although shown in FIG. 6 as a stand-alone computing device 500 for purposes of example, a computing device may be any component or system that includes one or more processors or other suitable computing environment for executing software instructions and, for example, need not necessarily include one or more elements shown in FIG. 6 (e.g., communication units 506; and in some examples components such as storage device(s) 508 may not be co-located or in the same chassis as other components).

As shown in the example of FIG. 6, computing device 500 includes one or more processors 502, one or more input devices 504, one or more communication units 506, one or more output devices 512, one or more storage devices 508, and user interface (UI) device(s) 510. Computing device 500, in one example, further includes one or more application(s) 522, service overlay model engine 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an employee of the co-location facility provider may enter configuration data defining metrics for characterizing services. Service overlay model engine 524 may store the configuration data to storage devices 508, and in some examples uses the configuration data for building service model data 520.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and service overlay model engine 524 with processors 502, communication unit 506, storage device 508, input device 504, user interface devices 510, and output device 512.

Applications 522 and service overlay model engine 524 may also include program instructions and/or data that are executable by computing device 500. Service overlay model engine 524 may include instructions for causing computing device 500 to perform one or more of the operations and actions described in the present disclosure with respect to service overlay model engine 134.

Service overlay model engine 524 may include services testing module 526, illustrated with dashed lines to indicate that this may or may not be executable by any given example of computing device 500. For example, in some cases services testing module 526 may independently invoke an interface to the programmable network platform for sending test traffic from the network infrastructure of the co-location facility provider. In some examples, service overlay model engine 524 uses service testing module 526 to send test traffic from the co-location facility provider's equipment to one or more service providers to obtain information regarding performance of services provided by the service providers. In this way, service overlay model engine 524 may emulate a customer receiving services from the service provider, to collect data on metrics regarding actual performance of the services (e.g., file transfer, data storage, compute, and other services). In other cases, service overlay model engine 524 may rely solely on data already being collected for other purposes, and may not independently invoke an interface to the programmable network platform for sending test traffic from the network infrastructure of the co-location facility provider.

In the example of FIG. 6, storage devices 508 store telemetry data 530, service temporal data 532, service spatial data 534, service aggregate data 536, service support data 538, service provisioning time data 540, and service model data 520A-520N. In some examples, storage devices 508 may also store service provider data (not shown). These may correspond to service provider data 601, telemetry data 602, service temporal data 604, service spatial data 605, service aggregate data 606, service support data 608, service provisioning time data 609, and service model data 620A-620N. In some examples, each of service provider data 601, telemetry data 602, service temporal data 604, service spatial data 605, service aggregate data 606, service support data 608, service provisioning time data 609, and service model data 620A-620N of FIGS. 4 and 5.

Figure 7:
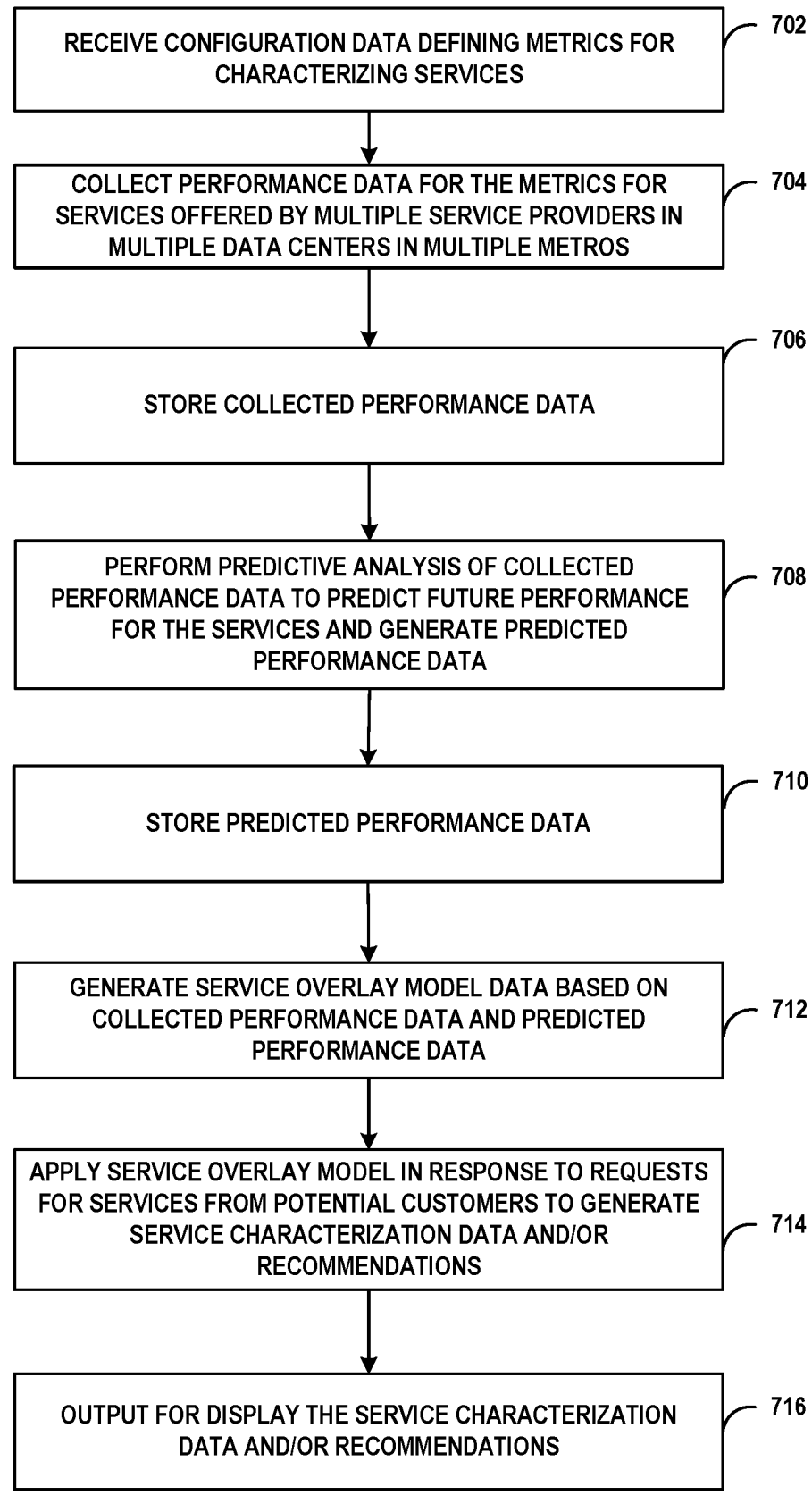
FIG. 7 is a flow diagram illustrating example operations of a computing device that generates and applies a service overlay model, in accordance with techniques of the disclosure.

FIG. 7 is a flow diagram illustrating example operations of a computing device that generates and applies a service overlay model, in accordance with techniques of the disclosure. FIG. 7 is described for purposes of example with respect to service overlay model engine 524 of FIG. 5, but the techniques of FIG. 7 are likewise applicable to service overlay model engine 134 described with respect to other figures. Service overlay model engine 524 received configuration data defining metrics for characterizing services (702). In some examples, the configuration data may be received via user interface device 510, such as from an employee of the co-location facility provider. Service overlay model engine 524 collects performance data for the metrics for services offered by multiple service providers in multiple data centers in multiple metros and/or regions (704). In some examples, service overlay model engine 524 uses service testing module 526 to send test traffic from the co-location facility provider's equipment to one or more service providers to obtain information regarding performance of services provided by the service providers. Service overlay model engine 524 stores the collected performance data (706). Service overlay model engine 524 performs predictive analysis of the collected performance data to predict future performance for the services and generate predicted performance data (708) (e.g., using characterization engine 612), and stores the predicted performance data (710). Service overlay model engine 524 generates service overlay model data based on the collected performance data and the predicted performance data (712), and stores the service overlay model data to service model data 520.

Service overlay model engine 524 applies the service overlay model in response to a request for services from a potential customer, to generate service characterization data and/or recommendations (714). The request may be received via a customer portal, for example, entered by an employee of an enterprise that is a potential customer. Service overlay model engine 524 may query one or more of telemetry data, service model data 520, or other sets of data. Service overlay model engine 524 outputs for display the service characterization data and/or recommendations (716). The service characterization data may include scoring data, or raw data from service model data 520 for purposes of comparison among service providers and different data centers, for example. In some examples, service overlay model engine 524 outputs a recommendation for a service provider or set of service providers from which to receive requested service(s). The display may be presented to the potential customer via the customer portal.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    identifying, by a service overlay model engine executing at a computing device, a plurality of service providers each offering at least one service;
    obtaining, by the service overlay model engine, first data obtained from the plurality of service providers describing the offered services;
    generating, by the service overlay model engine based on performance data for the offered services, second data describing one or more attributes of the offered services that characterize the offered services as delivered by the plurality of service providers, the performance data generated by a network that transports network traffic for the offered services;
    receiving, by the service overlay model engine, service requirements specified by a customer;
    outputting, by the service overlay model engine for display to a display device and based on the service requirements, the first data, and the second data, a proposed service chain for application of each of a plurality of the offered services by a selected one of the plurality of service providers to meet the service requirements;
    provisioning, by a programmable network platform, a service chain in the network for the customer based on the proposed service chain; and
    routing, through the service chain, network traffic of the customer.

2. The method of claim 1, further comprising:
    after outputting the proposed service chain, receiving, by the computing device, an indication of the customer's approval of the proposed service chain; and
    in response to receiving the indication, establishing, by the computing device, one or more interconnections for routing the network traffic through the service chain.

3. The method of claim 2, wherein the one or more interconnections comprise a virtual circuit.

4. The method of claim 1, wherein the plurality of service providers comprise a plurality of cloud service providers, wherein the offered services comprise a cloud service executed by each of the respective cloud service providers.

5. The method of claim 4, establishing, by the computing device, using a cloud exchange, at least one interconnection between networks of any of the plurality of cloud service providers and a network of the customer.

6. The method of claim 1, wherein outputting the proposed service chain comprises outputting a recommendation specifying the proposed service chain and the different service providers to apply each of the plurality of offered services in the service chain.

7. The method of claim 1, wherein generating the second data comprises generating the second data based on a temporal view of services indicating performance over time of the service by different service providers, wherein the second data is measured by a co-location facility provider within one or more co-location facilities.

8. The method of claim 1, wherein generating the second data comprises generating the second data describing the one or more attributes of the offered services based on a spatial view of services indicating different geographical regions and a plurality of co-location facilities in which the service is available.

9. The method of claim 1, wherein generating the second data comprises generating the second data describing the one or more attributes of the offered services based on an aggregate view of services indicating brokerage capability of a plurality of co-location facilities.

10. The method of claim 1, wherein generating the second data comprises generating data describing the one or more attributes of the offered services based on information relating to service support resolution time.

11. The method of claim 1, wherein generating the second data comprises generating data describing the one or more attributes of the offered services based on information relating to service provisioning time.

12. The method of claim 1, wherein outputting the proposed service chain comprises outputting the proposed service chain based on a service provisioning time requested by the customer.

13. The method of claim 1, wherein outputting the proposed service chain comprises outputting the information based on a service support resolution time requested by the customer.

14. The method of claim 1, wherein outputting the proposed service chain comprises outputting the information based on information relating to geographic requirements of the customer.

15. A computing device comprising:
    at least one computer processor; and
    a memory comprising instructions that when executed by the at least one computer processor cause the at least one computer processor to:
    identify a plurality of service providers each offering at least one service;

obtain first data obtained from the plurality of service providers describing the offered services;

generate, based on performance data for the offered services, second data describing one or more attributes of the offered services that characterize the offered services as delivered by the plurality of service providers, the performance data generated by a network that transports network traffic for the offered services;

receive service requirements specified by a customer;

output, for display to a display device and based on the service requirements, the first data, and the second data, a proposed service chain for application of each of a plurality of the offered services by a selected one of the plurality of service providers to meet the service requirements;

provision, by a programmable network platform, a service chain in the network for the customer based on the proposed service chain; and route, through the service chain, network traffic of the customer.

16. The computing device of claim 15, the memory further comprising instructions that when executed by the at least one computer processor cause the at least one computer processor to:

after outputting the proposed service chain, receive an indication of the customer's approval of the proposed service chain; and in response to receiving the indication, establish one or more interconnections for routing the network traffic through the service chain.

17. The computing device of claim 16, wherein the one or more interconnections comprise a virtual circuit.

18. The computing device of claim 16, wherein the instructions to establish one or more interconnections comprise establishing at least one interconnection using a cloud exchange for dynamically establishing interconnections between networks of any of the plurality of cloud service providers and a network of the customer.

19. The computing device of claim 15, the memory further comprising instructions that when executed by the at least one computer processor cause the at least one computer processor to:

output a recommendation specifying the proposed service chain and the different service providers to apply each of the plurality of offered services in the service chain.

20. A non-transitory computer-readable storage medium encoded with instructions that, when executed, cause at least one processor of a computing device to:

identify a plurality of service providers each offering at least one service;

obtain first data obtained from the plurality of service providers describing the offered services;

generate, based on performance data for the offered services, second data describing one or more attributes of the offered services that characterize the offered services as delivered by the plurality of service providers, the performance data generated by a network that transports network traffic for the offered services;

receive service requirements specified by a customer;

output, for display to a display device and based on the service requirements, the first data, and the second data, a proposed service chain for application of each of a plurality of the offered services by a selected one of the plurality of service providers to meet the service requirements;

provision by a programmable network platform a service chain in the network for the customer based on the proposed service chain; and route, through the service chain, network traffic of the customer.

* * * * *